US012651307B1

(12) United States Patent　　　　　(10) Patent No.:　US 12,651,307 B1

Hamill et al.　　　　　　　　　　　(45) Date of Patent:　　Jun. 9, 2026

(54) SYSTEMS AND METHODS FOR PRESENTING VIDEOS

(71) Applicant: GoPro, Inc., San Mateo, CA (US)

(72) Inventors: Joshua Hamill, Salem, OR (US); Frank Rodriguez, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 328 days.

(21) Appl. No.: 18/409,036

(22) Filed: Jan. 10, 2024

(51) Int. Cl.
| | |
|---|---|
| *G06T 3/16* | (2024.01) |
| *G06F 3/048* | (2013.01) |
| *G06F 3/04815* | (2022.01) |
| *G06F 3/04842* | (2022.01) |
| *G06F 3/04855* | (2022.01) |
| *G06F 3/04817* | (2022.01) |

(52) U.S. Cl.
CPC ............ *G06T 3/16* (2024.01); *G06F 3/04855* (2013.01); *G06F 3/048* (2013.01); *G06F 3/04815* (2013.01); *G06F 3/04817* (2013.01); *G06F 3/04842* (2013.01); *G06T 2200/24* (2013.01)

(58) Field of Classification Search
CPC ... G06T 3/16; G06T 2200/24; G06F 3/04855; G06F 3/04817; G06F 3/04815; G06F 3/04842; G06F 3/048
See application file for complete search history.

(56) References Cited

U.S. PATENT DOCUMENTS

| | | | | |
|---|---|---|---|---|
| 9,361,521 | B1 * | 6/2016 | McLean .............. | G06F 3/04847 |
| 10,217,488 | B1 * | 2/2019 | Huang ................. | H04N 9/8205 |
| 2018/0005666 | A1 * | 1/2018 | Yang ........................... | G06T 7/97 |
| 2018/0241986 | A1 * | 8/2018 | Zhong ..................... | G06T 3/147 |
| 2019/0243530 | A1 * | 8/2019 | De Ridder .......... | G06F 3/04815 |
| 2019/0273837 | A1 * | 9/2019 | Townsend ........... | H04N 1/2108 |
| 2019/0313119 | A1 * | 10/2019 | Han ..................... | H04N 19/174 |

* cited by examiner

*Primary Examiner* — Ting Z Lee
(74) *Attorney, Agent, or Firm* — Esplin & Associates, PC

(57) ABSTRACT

A video may include visual content having a field of view. Extents of the visual content within a viewing window may be presented on an electronic display. For a time point in the video, the video may be framed by positioning the viewing window within the field of view of the visual content. The framing of the video at the time point in the video may be extended to a duration in the video. The extended framing of the video over the duration may be presented within a graphical user interface.

18 Claims, 9 Drawing Sheets

METHOD 200

201 Obtain video information defining a video, the video having a progress length, the video including visual content viewable as a function of progress through the progress length.

202 Obtain framing information for the video, the framing information defining framing of the visual content at a point within the progress length.

203 Extend the framing of the visual content at the point within the progress length to a duration within the progress length.

204 Effectuate presentation of a graphical user interface on an electronic display, the graphical user interface including interface elements, wherein the interface elements include a timeline element and a framing element, the timeline element including a timeline representation of the progress length of the video, the framing element representing the framing of the visual content over the duration within the progress length.

System 10

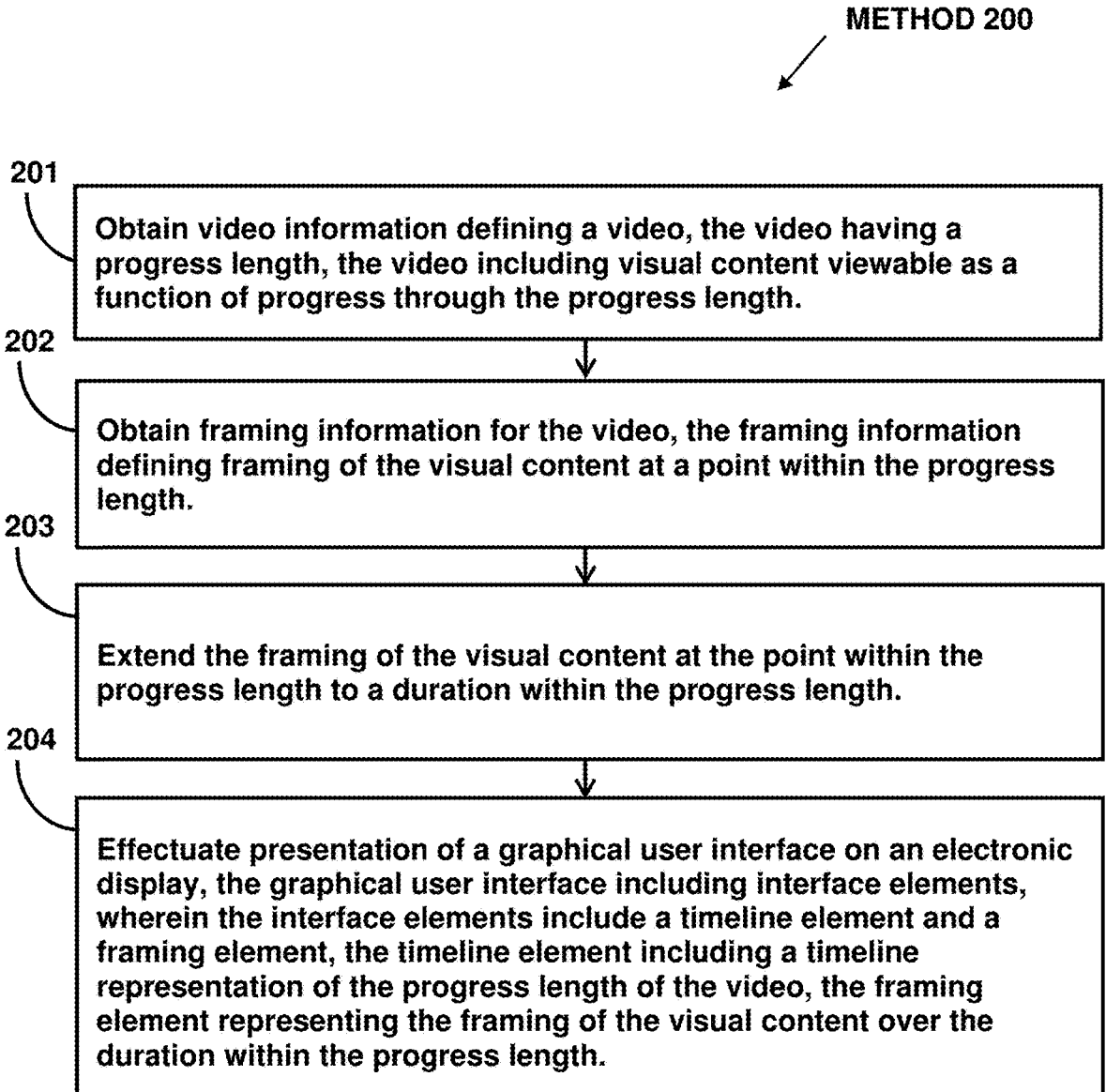

METHOD 200

201

Obtain video information defining a video, the video having a progress length, the video including visual content viewable as a function of progress through the progress length.

202

Obtain framing information for the video, the framing information defining framing of the visual content at a point within the progress length.

203

Extend the framing of the visual content at the point within the progress length to a duration within the progress length.

204

Effectuate presentation of a graphical user interface on an electronic display, the graphical user interface including interface elements, wherein the interface elements include a timeline element and a framing element, the timeline element including a timeline representation of the progress length of the video, the framing element representing the framing of the visual content over the duration within the progress length.

FIG. 2 visual content 300 viewing window 310 visual content 300 viewing window 310 visual content 300 viewing window 310 point framing 410 duration framing 420

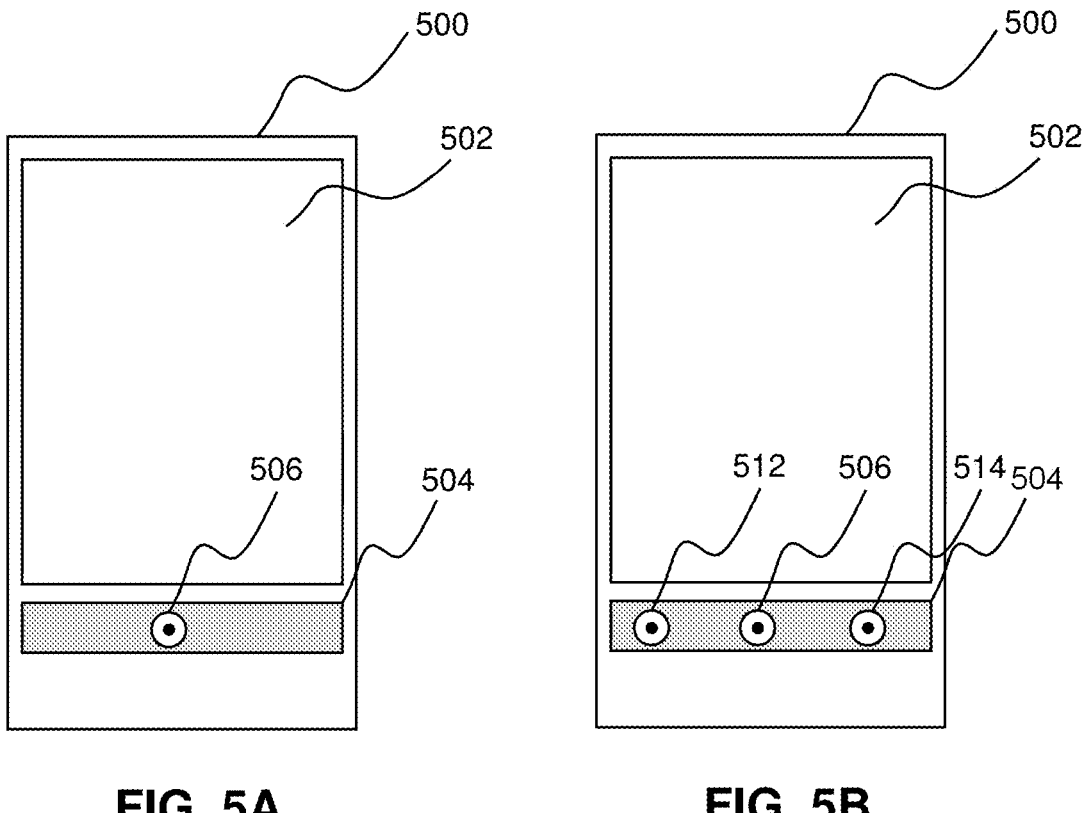
FIG. 5A                    FIG. 5B

1

SYSTEMS AND METHODS FOR PRESENTING VIDEOS

FIELD

This disclosure relates to presenting videos.

BACKGROUND

A wide field of view video (e.g., spherical video, panoramic video) may include more visual content than may be viewed at once. Framing the video to display different spatial portions of the video during presentation of the video may be difficult and time consuming.

SUMMARY

This disclosure relates to presenting videos. Video information, framing information, and/or other information may be obtained. The video information may define a video. The video may have a progress length. The video may include visual content viewable as a function of progress through the progress length of the video. The visual content may have a field of view. The framing information for the video may define framing of the visual content at a point within the progress length of the video. The framing of the visual content may define positioning of a viewing window within the field of view of the visual content. The framing of the visual content at the point within the progress length of the video may be extended to a duration within the progress length of the video. The duration to which the framing is extended may be longer than the point. Presentation of a graphical user interface on an electronic display may be effectuated. The graphical user interface may include interface elements. The interface elements may include a timeline element, a framing element, and/or other interface elements. The timeline element may include a timeline representation of the progress length of the video. The framing element may represent the framing of the visual content over the duration within the progress length.

A system for presenting videos may include one or more electronic storages, one or more processors, and/or other components. An electronic storage may store video information, information relating to a video, information relating to visual content, framing information, information relating to framing of the visual content, information relating to a viewing window, information relating to positioning of the viewing window, information relating to extension of the framing of the visual content, information relating to a graphical user interface, information relating to interface elements, and/or other information.

The processor(s) may be configured by machine-readable instructions. Executing the machine-readable instructions may cause the processor(s) to facilitate presenting videos. The machine-readable instructions may include one or more computer program components. The computer program components may include one or more of a video information component, a framing information component, a framing extension component, a graphical user interface component, and/or other computer program components.

The video information component may be configured to obtain video information and/or other information. The video information may define a video. The video may have a progress length. The video may include visual content viewable as a function of progress through the progress length of the video. The visual content may have a field of view.

The framing information component may be configured to obtain framing information for the video and/or other information. The framing information may define framing of the visual content at a point within the progress length. The framing may define positioning of a viewing window within the field of view of the visual content.

In some implementations, the framing of the video at the point within the progress length may include a viewing direction for the viewing window at the point within the progress length.

The framing extension component may be configured to extend the framing of the visual content. The framing of the visual content at the point within the progress length may be extended to a duration within the progress length. The duration may be longer than the point.

In some implementations, the framing of the visual content at the point within the progress length may be extended to the duration within the progress length by duplicating the framing of the visual content at the point into a first extended framing at a start of the duration and a second extended framing at an end of the duration. The point may be located at a midpoint of the duration. The framing of the visual content extended over the duration may include the first extended framing at the start of the duration and the second extended framing at the end of the duration. The framing of the visual content extended over the duration may further include the framing of the visual content at the point within the progress length.

The graphical user interface component may be configured to effectuate presentation of a graphical user interface on an electronic display. The graphical user interface may include interface elements. The interface elements may include a timeline element, a framing element, and/or other interface elements. The timeline element may include a timeline representation of the progress length of the video. The framing element may represent the framing of the visual content over the duration within the progress length of the video.

In some implementations, the framing element may include a framing start element to represent the beginning of the duration and a framing end element to represent the end of the duration. The framing start element and the framing end element may be interactable as handles to change the duration.

In some implementations, a dynamic framing effect may be applied to the duration. The dynamic framing effect may change the framing of the visual content over the duration.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for presenting videos.

FIG. 5A illustrates an example graphical user interface.
FIG. 5B illustrates an example graphical user interface.

DETAILED DESCRIPTION

Figure 1:
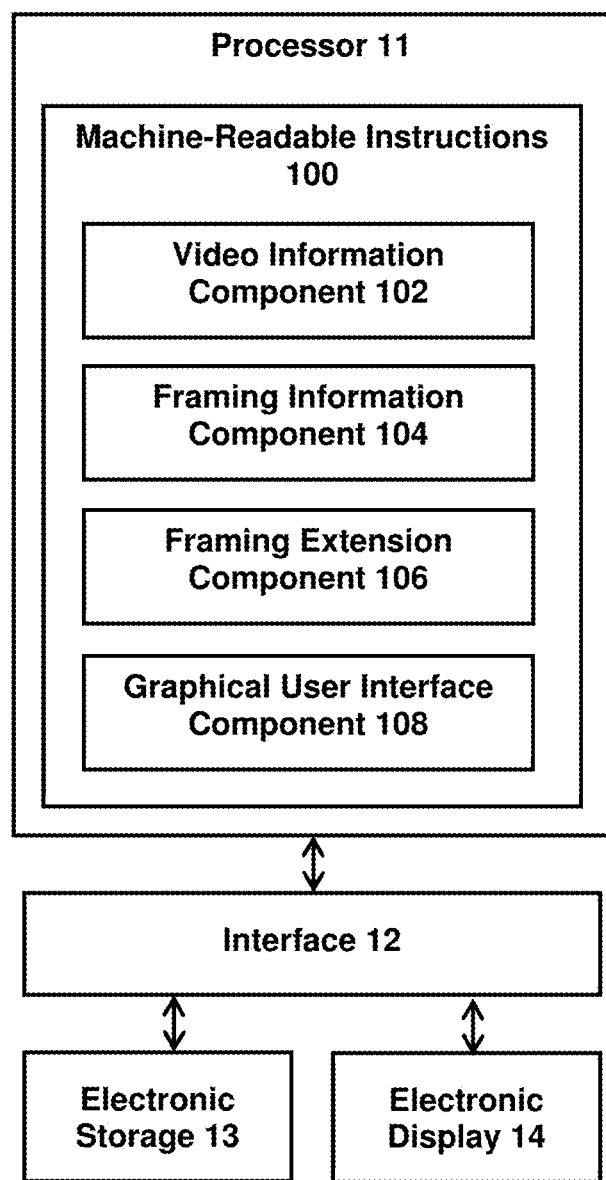
FIG. 1 illustrates an example system for presenting videos.

FIG. 1 illustrates a system 10 for presenting multiple views of videos. The system 10 may include one or more of a processor 11, an interface 12 (e.g., bus, wireless interface), an electronic storage 13, an electronic display 14, and/or other components. Video information, framing information, and/or other information may be obtained by the processor 11. The video information may define a video. The video may have a progress length. The video may include visual content viewable as a function of progress through the progress length of the video. The visual content may have a field of view. The framing information for the video may define framing of the visual content at a point within the progress length of the video. The framing of the visual content may define positioning of a viewing window within the field of view of the visual content. The framing of the visual content at the point within the progress length of the video may be extended by the processor 11 to a duration within the progress length of the video. The duration to which the framing is extended may be longer than the point. Presentation of a graphical user interface on an electronic display may be effectuated by the processor 11. The graphical user interface may include interface elements. The interface elements may include a timeline element, a framing element, and/or other interface elements. The timeline element may include a timeline representation of the progress length of the video. The framing element may represent the framing of the visual content over the duration within the progress length.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, framing information, information relating to framing of the visual content, information relating to a viewing window, information relating to positioning of the viewing window, information relating to extension of the framing of the visual content, information relating to a graphical user interface, information relating to interface elements, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, framing information, information relating to framing of the visual content, information relating to a viewing window, information relating to positioning of the viewing window, information relating to extension of the framing of the visual content, information relating to a graphical user interface, information relating to interface elements, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to see every spatial extent of the scene depicted within the video. For example, a user may wish to see a zoomed in view of different extents of the video at different moments (e.g., time points, duration) within the video. Customizing the playback of the video to control which extents of the video are present at different moments may be difficult and time consuming.

The present disclosure facilitates customization of video playback to control which extents of the video are present at different moments. For a time point in the video, the video may be framed by positioning a viewing window within the field of view of the visual content. The framing of the video at the time point in the video may be extended to a duration in the video. The extended framing of the video over the duration may be presented within a graphical user interface. The graphical user interface may enable use of visual effects (e.g., cinematic effects, lens effects) in the presentation of the video.

The processor 11 (or one or more components of the processor 11) may be configured to obtain information to facilitate presenting videos. Obtaining information may include one or more of accessing, acquiring, analyzing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting videos. The machine-readable instructions 100 may include one or more computer program components. The machine-readable instructions 100 may include one or more of a video information component 102, a framing information component 104, a framing extension component 106, a graphical user interface component 108, and/or other computer program components.

The video information component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. A video may have a progress length. A video may include visual content viewable as a function of progress through the progress length of the video. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The visual content may have a field of view. A field of view of a video/visual content may refer to a field of view of a scene captured within the video/visual content (e.g., within video frames). A field of view of a video/visual content may refer to the extent of a scene that is captured within the video/visual content. In some implementations, the field of view of a video/visual content may be greater than or equal to 180-degrees. In some implementations, the field of view of a video/visual content may be smaller than or equal to 180-degrees.

In some implementations, a video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. Other fields of view of videos are contemplated. A wide field of view video may include and/or may be associated with spatial audio.

Content of one or more videos may be referred to as video content. Video content may include visual content, audio content, and/or other content. For example, video content may include visual content viewable as a function of progress through the progress length of the video, audio content playable as a function of progress through the progress length of the video, and/or other content that may be played back as a function of progress through the progress length of the video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The framing information component 104 may be configured to obtain framing information for the video and/or other information. The framing information may define framing of the visual content at one or more points (time points, video frame positions) within the progress length of the video. Framing of the visual content may refer to how the visual content is framed for presentation. Framing of the visual content may define positioning of a viewing window within the field of view of the visual content. A viewing window may define the extents of the visual content to be included within a presentation (view, display) of the video. A viewing window may define extents of the visual content to be included within a punchout of the visual content. A punchout of visual content may refer to an output of one or more portions of the visual content for presentation (e.g., current presentation, future presentation based on a video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. Individual framing of the visual content may define (e.g., determine, establish, include, set) positioning of the viewing window within the field of view of the visual content based on the corresponding viewing direction, viewing size, viewing rotation, and/or other information. For example, framing of the video at a point within the progress length may include a viewing direction for the viewing window at the point within the progress length. The framing of the video at the point within the progress length may further include a viewing size, a viewing rotation, and/or a viewing projection.

A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

The framing information may define framing of the visual content by including information that defines one or more content, qualities, attributes, features, and/or other aspects of the set of framing/viewing window. For example, the framing information may define framing of the visual content by including information that specifies positioning of a viewing window for different points within the progress length of the video. The framing information may define framing of the visual content by including information from which the positioning of the viewing window for different points within the progress length of the video may be determined. Other types of framing information are contemplated.

Figure 3A:
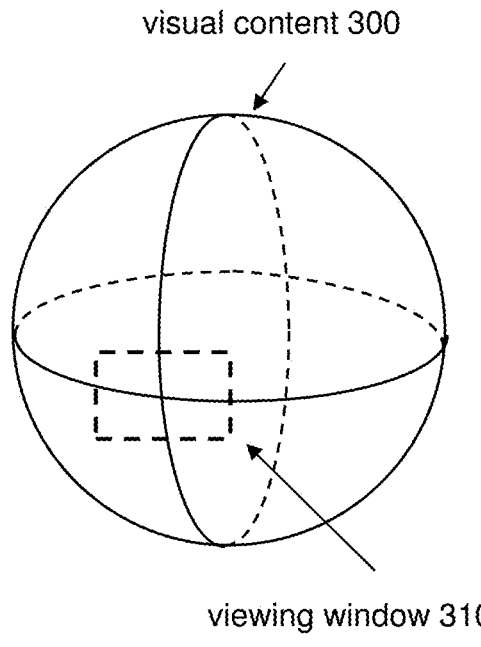
FIG. 3A illustrates an example positioning of a viewing window.
Figure 3B:
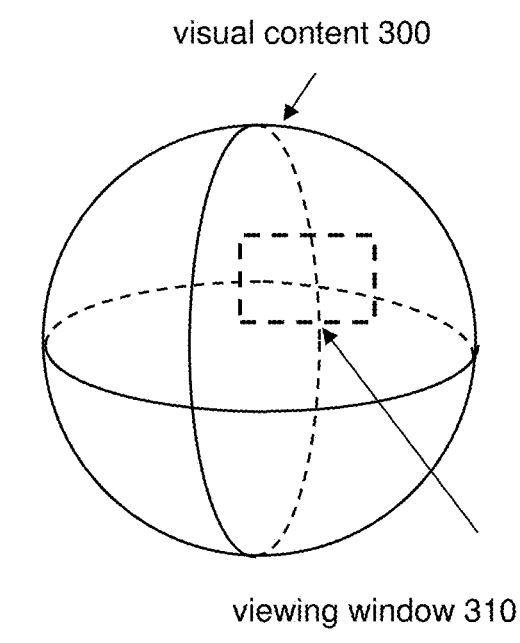
FIG. 3B illustrates an example positioning of a viewing window.
Figure 3C:
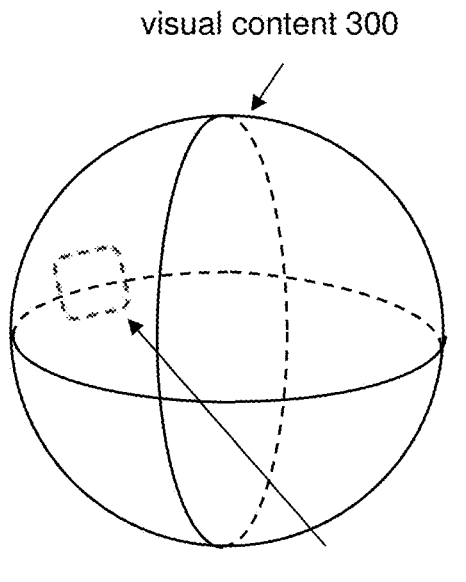
FIG. 3C illustrates an example positioning of a viewing window.

FIGS. 3A, 3B, and 3C illustrate example positioning of a viewing window 310 within the field of view (spherical field of view) of visual content 300. In FIG. 3A, the viewing window 310 may be positioned to be centered on the front of the visual content 400. In FIG. 3B, the viewing window 310 may be positioned to be centered on the back of the visual content 400. In FIG. 3C, the viewing window 310 may be positioned to be centered on the back-right of the visual content.

In some implementations, the framing information component 104 may obtain framing information for a video based on a user's interaction with a user interface/application (e.g., video editing application, video player application), and/or other information. The user interface/application may provide option(s) for a user to set and/or define framing of the video/visual content of the video. For example, the user interface/application may enable the user to select individual points within the progress length of the video to specify framing of the visual content of the video at the selected points by setting one or more of the viewing direction, the viewing size, the viewing rotation, the viewing projection, and/or other information to define the framing of the visual content at the selected points. The user interface/application may provide option(s) for a user to set and/or define framing of the video/visual content of the video with respect to a viewing window. For example, the user input may specify one or more of the viewing direction, the viewing size, the viewing rotation, the viewing projection, and/or other information to define framing of the visual content at one or more points for a viewing window.

In some implementations, the framing information component 104 may obtain framing information based on the video information and/or the video information component 102 obtaining the video information. For example, the framing information may be associated with the video/video information obtained by the video information component 102, and the framing information component 104 may obtain the associated framing information based on obtaining of the video information. The framing information may be included within metadata of the obtained video, and the framing information may be obtained based on obtaining (e.g., selection, retrieval) of the video. The framing information may be included within the video information, and the framing information component 104 may obtain framing information by extracting the framing information from the video information. For example, the framing information for a video may be generated during or after the capture of the video, and the framing information component 104 may obtain the framing information generated during or after the capture of the video.

In some implementations, the framing information component 104 may obtain framing information based on analysis of the video information and/or the video defined by the video information. For example, visual content detection (e.g., object detection, scene detection, activity detection) and/or audio content detection (e.g., sound detection, speech detection, command detection, cheering detection) may be performed and the framing of the visual content (e.g., number of framing; locations of the framing within the progress length; viewing directions, viewing sizes, viewing rotations, and/or viewing projections of framing) may be determined based on the results of the visual content detection (e.g., object, scene, and/or activity detected within the visual content) and/or the audio content detection (e.g., sound, speech, command, and/or cheering detected within the visual content). That is, content analysis of the video may be used to automatically determine framing of the visual content.

An individual framing of the visual content may define positioning of a viewing window within the field of view of the visual content at a point within the progress length of the video. A point within the progress length may include a specific time point or a specific video frame position within the progress length. A point within the progress length may include a time duration less than a threshold duration or a number of video frame positions less than a threshold number of video frame positions. A framing for a point within the progress length of the video may be referred to as a point framing.

Figure 4A:
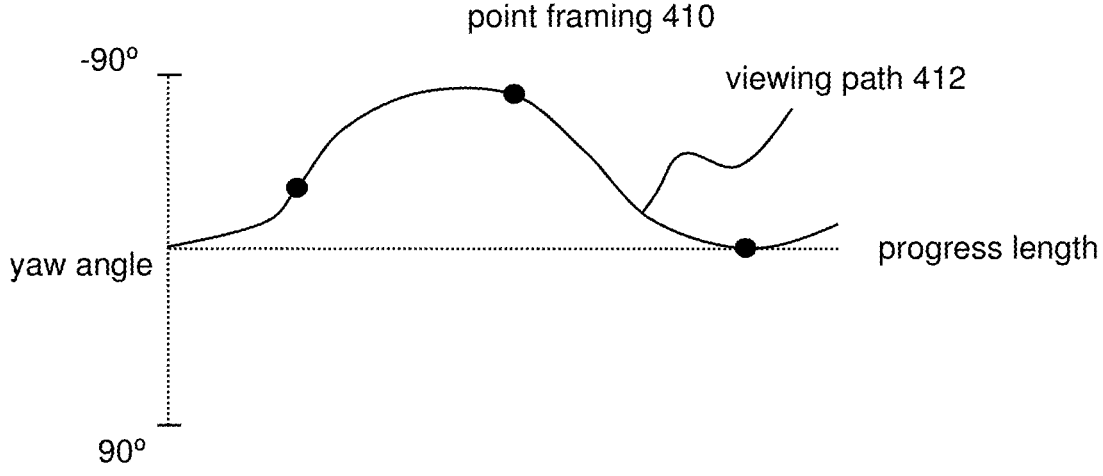
FIG. 4A illustrates example point framing of visual content.

FIG. 4A illustrates example point framing 410 of visual content. The point framing 410 may include framing of the visual content at three different time points within the progress length of the video. Presentation of the video may be controlled based on the point framing 410 to include different spatial extents of the visual content at different times within the presentation. Generating/providing presentation of the video may include generating a video clip that includes a particular view of the visual content and/or providing the particular view of the visual content on the electronic display 14.

The presentation of the video may switch between different spatial extents of the visual content set by different point framing. For example, the viewing window of the visual content may be position at 0-degree yaw angle at the beginning of the video, then change in the positive direction to run through the first framing, then peak and change in the negative direction to run through the second framing, and continue the change in the negative direction to run through the third framing. As shown in FIG. 4A, the use of point framing 410 may result in the presentation changing through the yaw angles set by the point framing 410. Such constant changes in the viewing directions in the presentation may not be the desired result of the framing. For instance, it may be desirable for the presentation of the video to show a particular framing of the visual content for a duration of time, rather than at a point within the progress length of the video.

The framing extension component 106 may be configured to extend the framing of the visual content. Extending the framing of the visual content may include adjusting, changing, modifying the framing, and/or replacing the framing so that the framing covers a longer duration within the progress length of the video. The framing of the visual content at a point within the progress length may be extended to a duration within the progress length. The duration may be longer than the point. For example, the framing for a point within the progress length may be extended to a duration that includes a range of points within the progress length. The framing may be extended to lengthen the amount of time particular framing of the visual content is used within the presentation of the video. A framing for a duration within the progress length of the video may be referred to as a duration framing.

Figure 4B:
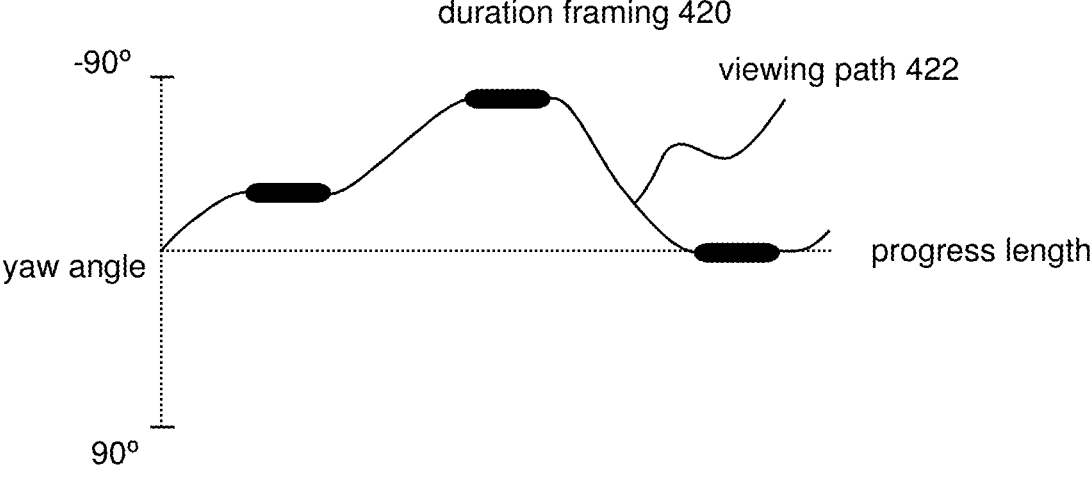
FIG. 4B illustrates example duration framing of visual content.

FIG. 4B illustrates example duration framing 420 of visual content. The duration framing 420 may include framing of the visual content at three different durations within the progress length of the video. The duration framing 420 may include the point framing 410 (shown in FIG. 4A) that have been extended to longer durations. Such extension of point framing may change the presentation of the video so that the presentation lingers/stays on individual framing for a duration of time, rather than just changing through the framing.

In some implementations, the framing of the visual content at a point within the progress length may be extended to the duration within the progress length by duplicating the framing of the visual content at the point into one extended framing at the start of the duration and another extended framing at the end of the duration. That is, the framing extension component 106 may extend the framing from the point within the progress length to a duration within the progress length by duplicating the framing at the point to a new framing at the beginning of the duration and another new framing at the end of the duration.

For example, FIG. 5A illustrates an example graphical user interface 500. The graphical user interface 500 may include a display section 502. The display section 502 may refer to a space within the graphical user interface 500 that include presentation of visual content. The graphical user interface 500 may include a timeline element 504. The timeline element 504 may include a timeline representation of the progress length of the video. The timeline element 504/timeline representation may visually represent a portion of the progress length of the video or the entire progress length of the video. The graphical user interface 500 may include a framing element 506. The framing element 506 may represent the framing of the visual content at a particular point within the progress length of the video.

Extending the framing represented by the framing element 506 may include duplicating the framing to cover a duration rather than a point in the progress length. For example, as shown in FIG. 5B, the framing represented by the framing element 506 may be duplicated to the starting point of the duration (duplicated framing represented by a framing element 512) and the ending point of the duration (duplicated framing represented by a framing element 514). In this example duplication of the framing for a point, the original point may be located at the midpoint of the extended duration. In some implementations, the framing for a point may be extended so that the duration is centered at the original point. In some implementations, the framing for a point may be extended so that the duration is not centered at the original point.

The framing of the visual content extended over the duration may include the starting and the ending framing. The framing of the visual content extended over the duration may include one extended framing at the start of the duration and another extended framing at the end of the duration. The framing of the visual content extended over the duration may include the starting, the ending, and the original framing. The framing of the visual content extended over the duration may further include one extended framing at the start of the duration, another extended framing at the end of the duration, and the original framing of the visual content at the point within the progress length.

In some implementations, the framing for a point within the progress length may be automatically extended to a duration within the progress length. Multiple framing for multiple points within the progress length of the video may be automatically extended to multiple durations within the progress length. In some implementations, the framing for a point may be extended to a set duration within the progress length. The amount of time to which the point is extended may be determined based on defaults/system settings. Individual framing may be extended to last the same length of time within the process length. In some implementations, the framing for different points may be extended to different durations. The amount of time to which different points are extended may be determined based on the type of framing, the source of the framing (e.g., manually set by a user, automatically set based on content analysis), and/or other information. Different framing may be extended to different lengths of time within the progress length.

In some implementations, the framing for a point within the progress length may be manually extended to a duration within the progress length. A user may be provided with one or more options to manually extend the framing. A user may be provided with option(s) to extend a particular framing or multiple framing at the same time. For example, a graphical user interface may include interface elements that enables a user to select framing to be extended and/or to change the length of framing.

The graphical user interface component 108 may be configured to effectuate presentation of one or more graphical user interfaces on one or more electronic displays (e.g., the electronic display 14). Effectuating presentation of a graphical user interface on an electronic display may include causing, bringing about, facilitating, and/or otherwise effectuating presentation of the graphical user interface on the electronic display. A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information. A graphical user interface may include presentation of one or more punchouts of the visual content. One or more punchouts of the visual content may be included within a graphical user interface to provide views of one or more different spatial extents of the visual content.

The interface elements of the graphical user interface(s) may include one or more of a timeline element, a framing elements, and/or other interface elements. The timeline element may include a timeline representation of the progress length of the video. A timeline element may refer to an interface element that visually represents a portion or the entire the progress length of the video. The timeline element may include one or more timeline representations of the progress length of the video content. The timeline element may enable a user to provide input to the system 10 based on movement of a timeline representation to select a moment within the progress length. For example, a user may move/drag the timeline representation to change which moment in the progress length is presented on the electronic display 14 and/or for which moment in the progress length a framing of the visual content is set.

A framing element may refer to an interface element that visually representing framing of the visual content. A framing element may represent the framing of the visual content at a point or over a duration within the progress length of the video. The location of the framing element on/along the timeline element/timeline representation may correspond to the point/duration of the framing. A framing element may be interactable by the user to set/change the corresponding framing. For example, a framing element may be interacted (e.g., tapped on, clicked on) by a user to set/change one or more of the viewing direction, the viewing size, the viewing rotation, and/or the viewing projection for the framing.

FIGS. 5A, 5B, 5C, 5D, 5E, and 5F illustrate an example graphical user interface 500. The views of the graphical user interface 500 in FIGS. 5A, 5B, 50, 5D, 5E, and 5F are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 5A, 5B, 50, 5D, 5E, and/or 5F. Other graphical user interfaces are contemplated.

Referring to FIG. 5A, the graphical user interface 500 may include the framing element 506. The framing element 506 may represent the framing of the visual content at a particular point within the progress length of the video. Referring to FIG. 5B, the graphical user interface 500 may include the framing elements 506, 512, 514. The framing element 512 may represent the duplicated framing for the beginning of the extended duration and the framing element 514 may represent the duplicated framing for the end of the extended duration.

Figure 5C:
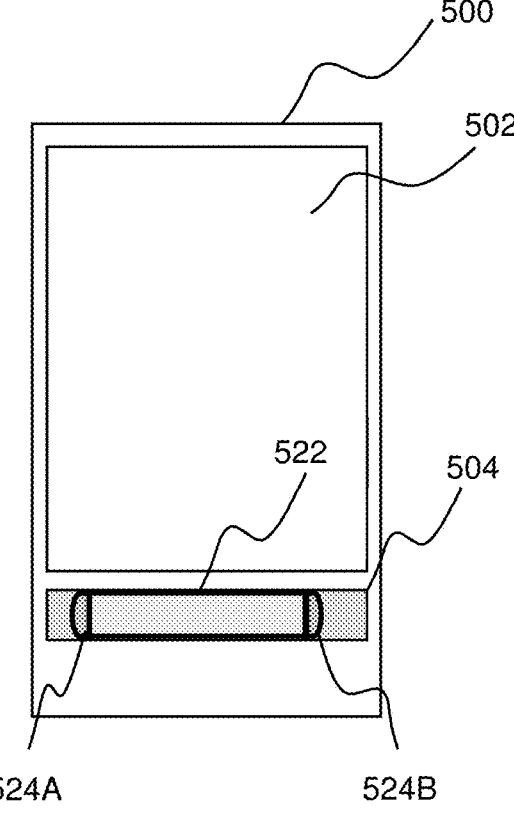
FIG. 5C illustrates an example graphical user interface.

Rather than including separate framing elements for duplicated framing of the visual content, the graphical user interface may include a framing element that represents the framing of the visual content over a duration. Referring to FIG. 5C, the graphical user interface 500 may include a framing element 522. The framing element 522 may represent the framing of the visual content over a duration within the progress length of the video. The framing element 522 may represent the framing of a point within the progress length that has been extended over the duration. The framing element 522 may include a framing start element 524A to represent the beginning of the duration and a framing end element 524B to represent the end of the duration. The framing start element 524A and the framing end element 524B may be interactable as handles to change the duration for the framing. For example, the user may interact with the framing start element 524A/the framing end element 524B to move the position of the framing start element 524A/the framing end element 524B and change the length of the duration for the framing. The framing start elements 524A, 524B may be shoulder/handle elements of the framing element 522.

Figure 5D:
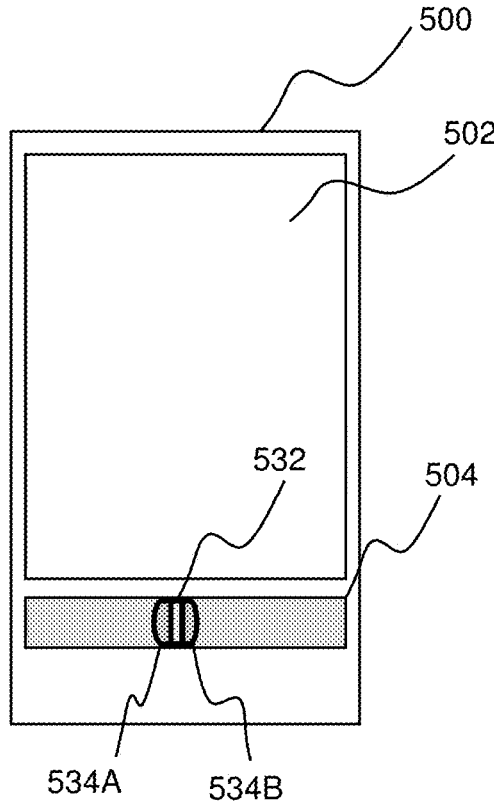
FIG. 5D illustrates an example graphical user interface.

Referring to FIG. 5D, the graphical user interface 500 may include a framing element 532. The framing element 532 represent the framing of the visual content at a point within the progress length of the video. The framing element 532 may include shoulder element 534A, 534B. The shoulder elements 534A, 534B may be interactable as handles to change the length of time for the framing. For example, the user may interact with the shoulder elements 534A, 534B to move the position of the shoulder elements 534A, 534B and extend the framing represented by the framing element 532 form being applied to a point within the progress length to a duration within the progress length.

Figure 5E:
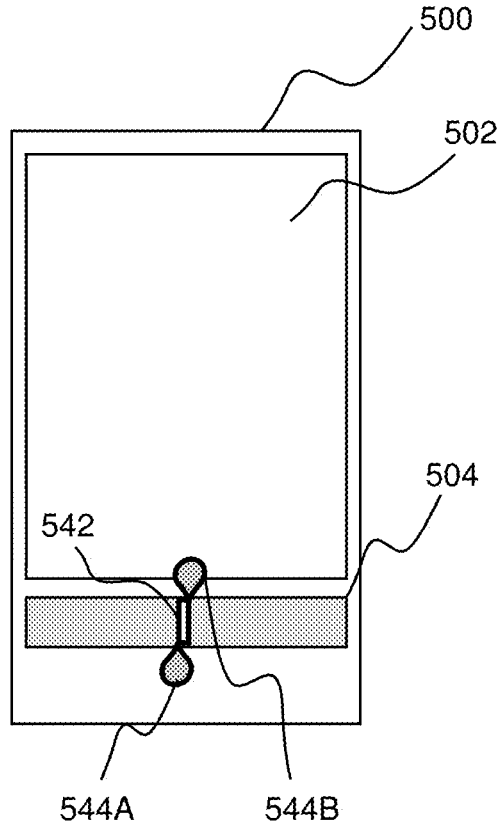
FIG. 5E illustrates an example graphical user interface.
Figure 5F:
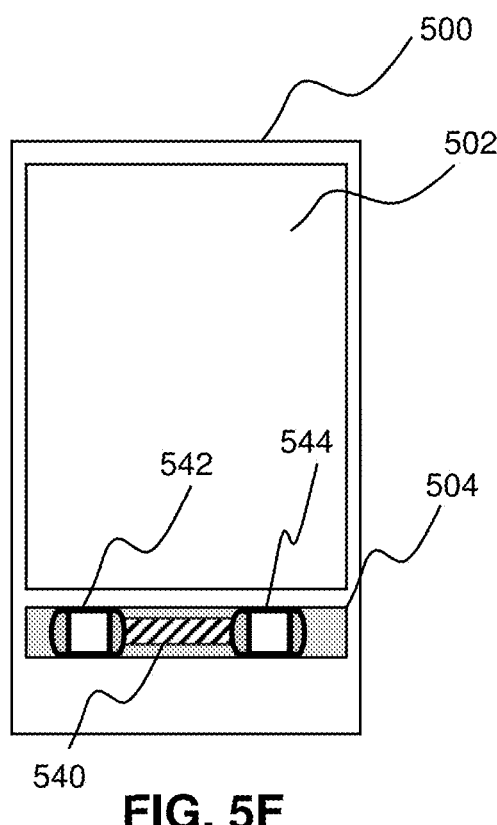
FIG. 5F illustrates an example graphical user interface.

Referring to FIG. 5E, the graphical user interface 500 may include a framing element 542. The framing element 542 represent the framing of the visual content at a point within the progress length of the video. The framing element 542 may include shoulder element 544A, 544B. The shoulder elements 544A, 544B may be interactable as handles to change the length of time for the framing. For example, the user may interact with the shoulder elements 544A, 544B to move the position of the shoulder elements 544A, 544B and extend the framing represented by the framing element 532 form being applied to a point within the progress length to a duration within the progress length. The shoulder elements 544A, 544B may be placed on opposite sides of the timeline element 504. The placement of the shoulder elements 544A, 544B on opposite sides of the timeline element 504 may make it easier for the user to interact with the shoulder elements 544A, 544B (e.g., push the shoulder element 544A without accidentally pressing the framing element 542 or the shoulder element 544B).

A graphical user interface may include multiple framing elements. A transition element may be presented between a pair of framing elements. A transition element may visually represent changes in the framing of the visual content between the two framing represented by the pair of framing elements. For example, referring to FIG. 5F, the graphical user interface 500 may include framing elements 542, 544 The framing elements 542, 544 may represent framing of the visual content over durations within the progress length of the video. The graphical user interface 500 may include a transition element 540. The transition element may visually represent the change in framing of the visual content as the presentation of the visual content progresses between the framing elements 542, 544. The graphical user interface 500 may provide option(s) for the user to change how the framing changes between the framing elements 542, 544 (e.g., change interpolation/easing used to generate framing path between the pair of framing).

A graphical user interface may include other interface elements to provide other options to the user in generating the presentation of the video. For instance, the graphical user interface may include interface elements to provide cinematic options to the user in generating the presentation of the video.

For example, a graphical user interface may include dynamic framing effect element. The dynamic framing effect element may enable a user to apply a dynamic framing effect to the video. The dynamic framing effect may be applied to a duration of framing. The dynamic framing effect may change the framing of the visual content over the duration. Applying the dynamic framing effect to the duration of framing may change the framing within the duration. The duration may start and end with the original framing, but may change over the duration. For example, the dynamic framing effect element may enable a user to select different types of dynamic framing effect, such as spin left, spin right, backflip, or little planet. Spin left dynamic framing effect may cause the framing to spin left from the original framing at the start of the duration and back to the original framing at the end of the duration. Spin right dynamic framing effect may cause the framing to spin right from the original framing at the start of the duration and back to the original framing at the end of the duration. Backflip dynamic framing effect may cause the framing to flip backwards from the original framing at the start of the duration and back to the original framing at the end of the duration. Spin right dynamic framing effect may change the projection used for the presentation to temporarily include the little planet view (use stereographic projection) within the duration. Other types of dynamic framing effect are contemplated. The graphical user interface may provide options to change how the dynamic framing effects are applied (e.g., a slider to change intensity of dynamic framing effects).

A graphical user interface may include dynamic transition effect element. The dynamic transition effect element may enable a user to apply a dynamic transition effect to the video. The dynamic transition effect may be applied to a transition between a pair of framing. The dynamic transition effect may change how the framing of the visual content changes between the pair of framing. Applying the dynamic transition effect to transition between the pair of framing may change the framing between the pair of framing. The transition may end with one framing and start with another framing, but may change between the two framing. For example, the dynamic transition effect element may enable a user to select different types of dynamic transition effect, such as smooth, shake, jump cut, wobble, or zoom. Smooth dynamic transition effect may cause the transition to smoothly change from one framing to the other framing. Shake dynamic transition effect may cause the transition to shake (simulate shaking of the image capture device) from one framing to the other framing. Jump cut dynamic transition effect may cause transition to cut from one framing to the other framing. Wobble dynamic transition effect may cause the transition to wobble side-to-side from one framing to the other framing. Zoom dynamic transition effect may cause the transition to change the level of zoom from one framing to the other framing. Other types of dynamic transition effect are contemplated. (e.g., a slider to change intensity of dynamic transition effects).

A graphical user interface may include lens effect element. The lens effect element may enable a user to simulate the use of different lenses in the video. The lens effect may change the distortion of visual content in the presentation. Different lens effects may utilize different sizes of viewing windows. A user may choose between different lens effects (e.g., narrow lens, linear lens, wide lens, SuperView, Hyper-View) to change the distortion/zoom used in the presentation. The graphical user interface may provide options to the user to modify the lenses. For example, the graphical user interface may provide a slider that enables a user to change the curvature of the lenses. The graphical user interface may provide options to the user to mix between different lenses. For example, the graphical user interface may provide a slider that enables a user to create a lens that is a mix between two fixed lenses.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for presenting videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length of the video. The visual content may have a field of view. In some implementations, operation 201 may be performed by a processor component the same as or similar to the video information component 102 (Shown in FIG. 1 and described herein).

At operation 202, framing information may be obtained. The framing information for the video may define framing of the visual content at a point within the progress length of the video. The framing of the visual content may define positioning of a viewing window within the field of view of the visual content. In some implementations, operation 202 may be performed by a processor component the same as or similar to the framing information component 104 (Shown in FIG. 1 and described herein).

At operation 203, the framing of the visual content at the point within the progress length of the video may be extended to a duration within the progress length of the video. The duration to which the framing is extended may be longer than the point. In some implementations, operation 203 may be performed by a processor component the same as or similar to the framing extension component 106 (Shown in FIG. 1 and described herein).

At operation 204, presentation of a graphical user interface on an electronic display may be effectuated. The graphical user interface may include interface elements. The interface elements may include a timeline element, a framing element, and/or other interface elements. The timeline element may include a timeline representation of the progress length of the video. The framing element may represent the framing of the visual content over the duration within the progress length. In some implementations, operation 204 may be performed by a processor component the same as or similar to the graphical user interface component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting videos, the system comprising:
   one or more physical processors configured by machine-readable instructions to:
   obtain video information defining a video, the video having a progress length, the video including visual content viewable as a function of progress through the progress length, the visual content having a field of view;
   obtain framing information for the video, the framing information defining framing of the visual content at a point within the progress length, the framing defining positioning of a viewing window within the field of view of the visual content;
   extend the framing of the visual content at the point within the progress length over a duration within the progress length, the duration longer than the point, wherein the framing of the visual content at the point within the progress length is extended to the duration within the progress length by duplicating the framing of the visual content at the point into a first extended framing at a start of the duration and a second extended framing at an end of the duration; and
   effectuate presentation of a graphical user interface on an electronic display, the graphical user interface including interface elements, wherein the interface elements include a timeline element and a framing element, the timeline element including a timeline representation of the progress length of the video, the framing element representing the framing of the visual content over the duration within the progress length, wherein the framing elements includes a framing start element to represent the start of the duration and a framing end element to represent the end of the duration.

2. The system of claim 1, wherein:
   the framing of the video at the point within the progress length includes a viewing direction for the viewing window at the point within the progress length; and
   the framing start element and the framing end element are interactable as handles to change the duration.

3. A system for presenting videos, the system comprising:
   one or more physical processors configured by machine-readable instructions to:
   obtain video information defining a video, the video having a progress length, the video including visual content viewable as a function of progress through the progress length, the visual content having a field of view;
   obtain framing information for the video, the framing information defining framing of the visual content at a point within the progress length, the framing defining positioning of a viewing window within the field of view of the visual content;
   extend the framing of the visual content at the point within the progress length over a duration within the progress length, the duration longer than the point, wherein the framing of the visual content at the point within the progress length is extended over the duration within the progress length by duplicating the framing of the visual content at the point into a first extended framing at a start of the duration and a second extended framing at an end of the duration; and effectuate presentation of a graphical user interface on an electronic display, the graphical user interface including interface elements, wherein the interface elements include a timeline element and a framing element, the timeline element including a timeline representation of the progress length of the video, the framing element representing the framing of the visual content over the duration within the progress length.

4. The system of claim 3, wherein the framing of the visual content extended over the duration includes the first extended framing at the start of the duration and the second extended framing at the end of the duration.

5. The system of claim 4, wherein the framing of the visual content extended over the duration further includes the framing of the visual content at the point within the progress length.

6. The system of claim 3, wherein the point is located at a midpoint of the duration.

7. The system of claim 3, wherein the framing element includes a framing start element to represent the start of the duration and a framing end element to represent the end of the duration.

8. The system of claim 7, wherein the framing start element and the framing end element are interactable as handles to change the duration.

9. The system of claim 3, wherein the framing of the video at the point within the progress length includes a viewing direction for the viewing window at the point within the progress length.

10. The system of claim 3, wherein the one or more physical processors are further configured by the machine-readable instructions to apply a dynamic framing effect to the duration, the dynamic framing effect changing the framing of the visual content over the duration.

11. A method for presenting videos, the method performed by a computing system including one or more processors, the method comprising:

obtaining, by the computing system, video information defining a video, the video having a progress length, the video including visual content viewable as a function of progress through the progress length, the visual content having a field of view;

obtaining, by the computing system, framing information for the video, the framing information defining framing of the visual content at a point within the progress length, the framing defining positioning of a viewing window within the field of view of the visual content;

extending, by the computing system, the framing of the visual content at the point within the progress length over a duration within the progress length, the duration longer than the point, wherein the framing of the visual content at the point within the progress length is extended over the duration within the progress length by duplicating the framing of the visual content at the point into a first extended framing at a start of the duration and a second extended framing at an end of the duration; and effectuating, by the computing system, presentation of a graphical user interface on an electronic display, the graphical user interface including interface elements, wherein the interface elements include a timeline element and a framing element, the timeline element including a timeline representation of the progress length of the video, the framing element representing the framing of the visual content over the duration within the progress length.

12. The method of claim 11, wherein the framing of the visual content extended over the duration includes the first extended framing at the start of the duration and the second extended framing at the end of the duration.

13. The method of claim 12, wherein the framing of the visual content extended over the duration further includes the framing of the visual content at the point within the progress length.

14. The method of claim 11, wherein the point is located at a midpoint of the duration.

15. The method of claim 11, wherein the framing element includes a framing start element to represent the start of the duration and a framing end element to represent the end of the duration.

16. The method of claim 15, wherein the framing start element and the framing end element are interactable as handles to change the duration.

17. The method of claim 11, wherein the framing of the video at the point within the progress length includes a viewing direction for the viewing window at the point within the progress length.

18. The method of claim 11, further comprising applying, by the computing system, a dynamic framing effect to the duration, the dynamic framing effect changing the framing of the visual content over the duration.

* * * * *